US009712576B1

(12) United States Patent
Gill

(10) Patent No.: US 9,712,576 B1
(45) Date of Patent: Jul. 18, 2017

(54) CROWD-SOURCED PROJECT AND TRANSACTION MANAGEMENT SYSTEM FOR HUMAN- AND DEVICE-ADAPTIVE REQUESTER-PROVIDER NETWORKS

(71) Applicant: Susan (Zann) Gill, Los Altos, CA (US)

(72) Inventor: Susan (Zann) Gill, Los Altos, CA (US)

( * ) Notice: Subject to any disclaimer, the term of this patent is extended or adjusted under 35 U.S.C. 154(b) by 585 days.

(21) Appl. No.: 14/133,235

(22) Filed: Dec. 18, 2013

Related U.S. Application Data

(63) Continuation of application No. 12/817,167, filed on Jun. 16, 2010, now Pat. No. 8,639,650, which is a continuation-in-part of application No. 11/733,736, filed on Apr. 10, 2007, now Pat. No. 7,853,551, which is a continuation-in-part of application No. 10/602,824, filed on Jun. 25, 2003, now abandoned.

(60) Provisional application No. 60/391,861, filed on Jun. 25, 2002, provisional application No. 61/187,485, filed on Jun. 16, 2009.

(51) Int. Cl.
| | | |
|---|---|---|
| *G06F 15/18* | (2006.01) | |
| *G06N 3/00* | (2006.01) | |
| *H04L 29/06* | (2006.01) | |
| *G06F 17/30* | (2006.01) | |
| *G06F 3/0481* | (2013.01) | |
| *G06Q 30/06* | (2012.01) | |

(52) U.S. Cl.
CPC ........ *H04L 65/403* (2013.01); *G06F 3/04817* (2013.01); *G06F 17/30598* (2013.01); *G06Q 30/0611* (2013.01)

(58) Field of Classification Search
CPC ............. G06F 15/18; G06N 3/00; G06N 3/12
USPC .......................................................... 706/13
See application file for complete search history.

(56) References Cited

U.S. PATENT DOCUMENTS

| | | | |
|---|---|---|---|
| 5,506,886 A | | 4/1996 | Maine et al. |
| 6,039,688 A | * | 3/2000 | Douglas .............. G06F 19/3475 128/921 |
| 6,041,311 A | | 3/2000 | Chislenko et al. |
| 6,115,683 A | | 9/2000 | Burstein et al. |

(Continued)

OTHER PUBLICATIONS

Bianca Innocenti, Beatriz Lopéz, Joaquim Salvi: Design Patterns for Combining Social and Individual Intelligences on Modular-Based Agents. HAIS 2008: 70-77.

(Continued)

*Primary Examiner* — Stanley K Hill
*Assistant Examiner* — Peter Coughlan
(74) *Attorney, Agent, or Firm* — Fernandez & Associates, LLP

(57) ABSTRACT

Provided is a computer-implemented system and method for a requester-provider, query-response network that augments internet-based social networks for crowd management, rapid updating, decision support, problem-solving, reporting, and activity-tracking for transaction management and status updates for large distributed and/or co-located events or projects, such that information distributed can be private, personally targeted, timely, tagged, and geo-localized, enabling users to contribute and respond to requests using natural language, receive postings customized to their needs and preferences, share information, assess alternatives, integrate crowd-sourced resources and process transactions across distributed human-machine systems running on a diversity of computer, mobile and device platforms.

21 Claims, 9 Drawing Sheets

*Diverse User Channels and Devices*

(56) References Cited

U.S. PATENT DOCUMENTS

| | | | |
|---|---|---|---|
| 6,847,959 B1 | 1/2005 | Arrouye et al. | |
| 7,089,237 B2 | 8/2006 | Turnbull et al. | |
| 7,197,459 B1 | 3/2007 | Harinarayan et al. | |
| 7,426,537 B2 | 9/2008 | Lee et al. | |
| 7,502,770 B2 | 3/2009 | Hillis et al. | |
| 2002/0023093 A1 | 2/2002 | Ziff et al. | |
| 2002/0059201 A1* | 5/2002 | Work | G06Q 10/10 |
| 2004/0139075 A1 | 7/2004 | Brodersen et al. | |
| 2004/0210602 A1 | 10/2004 | Hillis et al. | |
| 2005/0086188 A1 | 4/2005 | Hillis et al. | |
| 2007/0011281 A1 | 1/2007 | Jhoney et al. | |
| 2007/0201086 A1 | 8/2007 | Kim et al. | |
| 2008/0115082 A1 | 5/2008 | Simmons et al. | |
| 2008/0215623 A1 | 9/2008 | Ramer et al. | |
| 2009/0094224 A1 | 4/2009 | Ricket et al. | |
| 2009/0144392 A1 | 6/2009 | Wang et al. | |

OTHER PUBLICATIONS

Harry Kautz, Bart Selman, and Mehul Shah. "Combining Social Networks and Collaborative Filtering", communications of the ACM, vol. 40, No. 3, Mar. 1997, pp. 63-65.

Montaner, Miguel; López, Beatriz; De La Rosa, Josep LLUIS (2003), "A Taxonomy of Recommender Agents on the Internet,", Artif. Intel!. Rev., 19: 285-330.

Paul Resnick and Hal R. Varian. "Recommender Systems", Communication of the ACM, vol. 40, No. 3, Mar. 1997 pp. 56-58. doi 10.1145/245108.245121.

Aaditeshwar Seth. "Design of a Social Network Based Recommender System for Participatory Media Content", 2008, 6 pages.

Shanyang Zhao, Sherri Grasmuck, Jason Martin. Identity construction on Facebook: Digital empowerment in anchored relationships. Elsevier, Computers in Human Behavior. Volume 24, Issue 5, Sep. 2008, pp. 1816-1836.

* cited by examiner

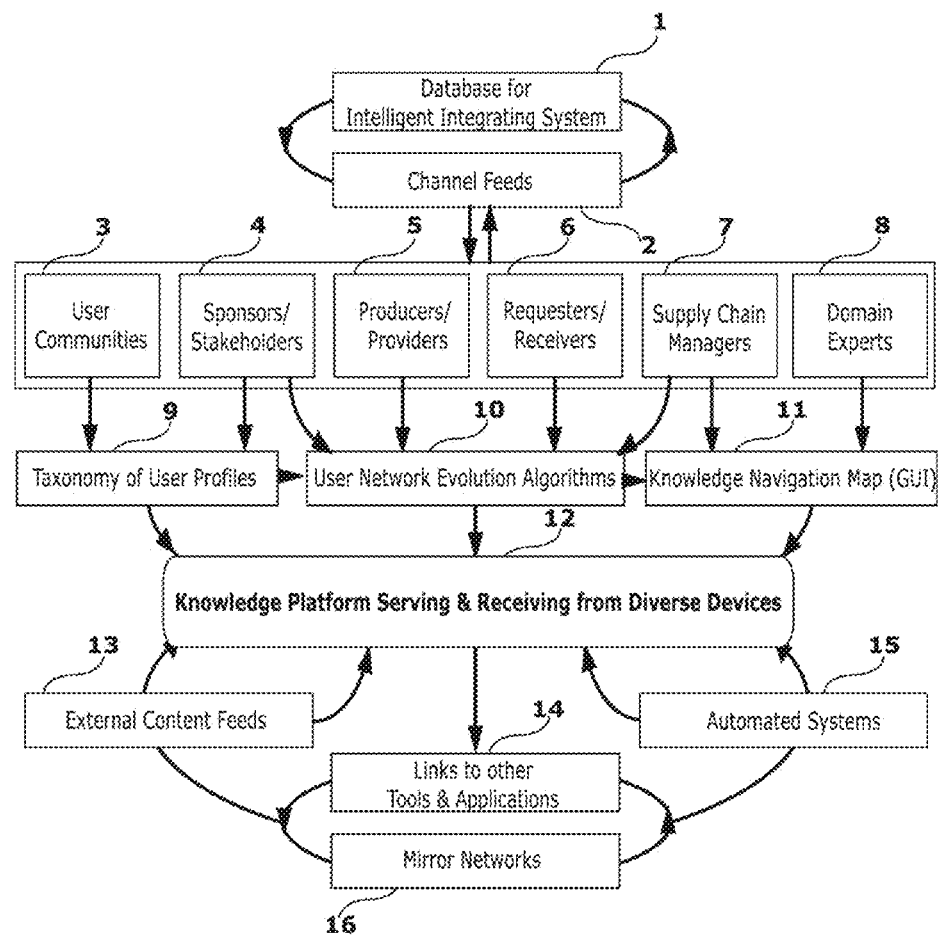
*Figure 1. Knowledge Platform for Data from Diverse Devices*

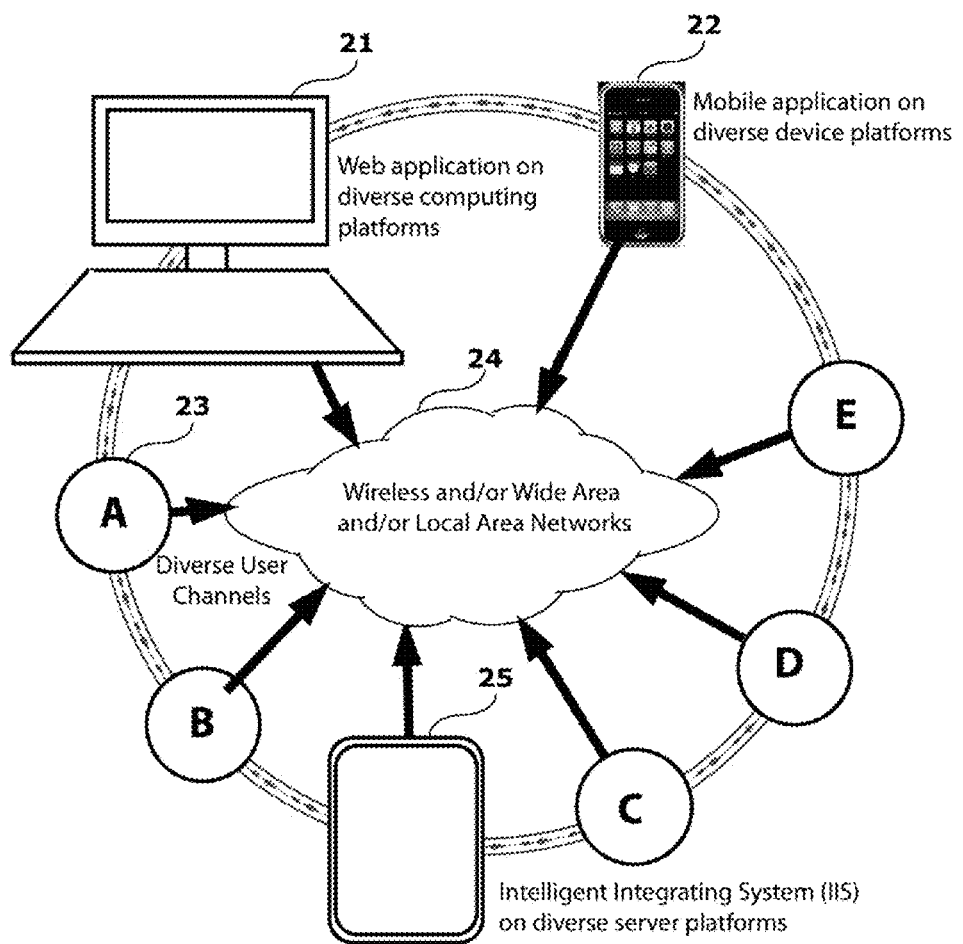
*Figure 2. Diverse User Channels and Devices*

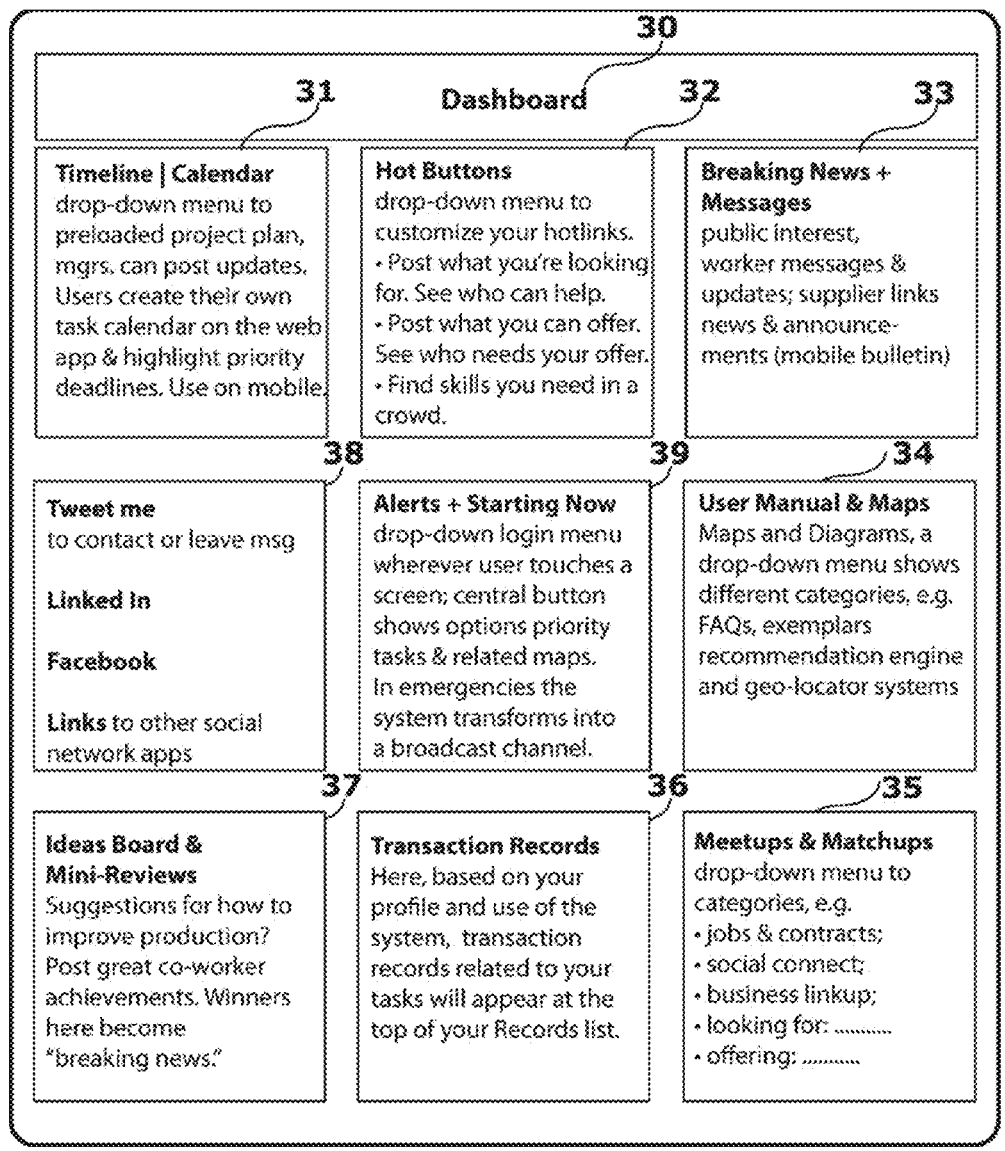
*Figure 3. Touch Screen User Interface & Feature Set in a Sample Embodiment Using Nine Buttons*

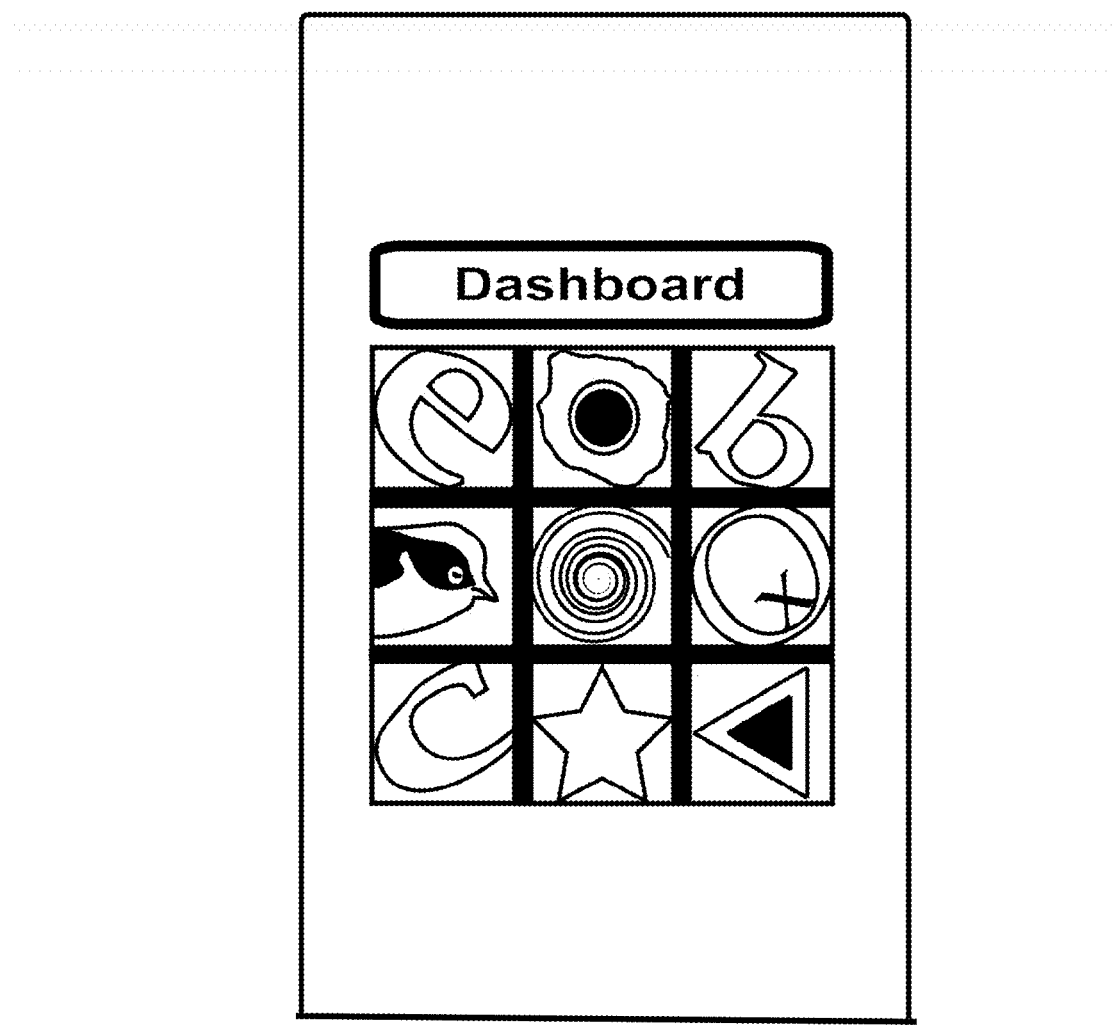
*Figure 4. Icon User Interface to Access Menus*

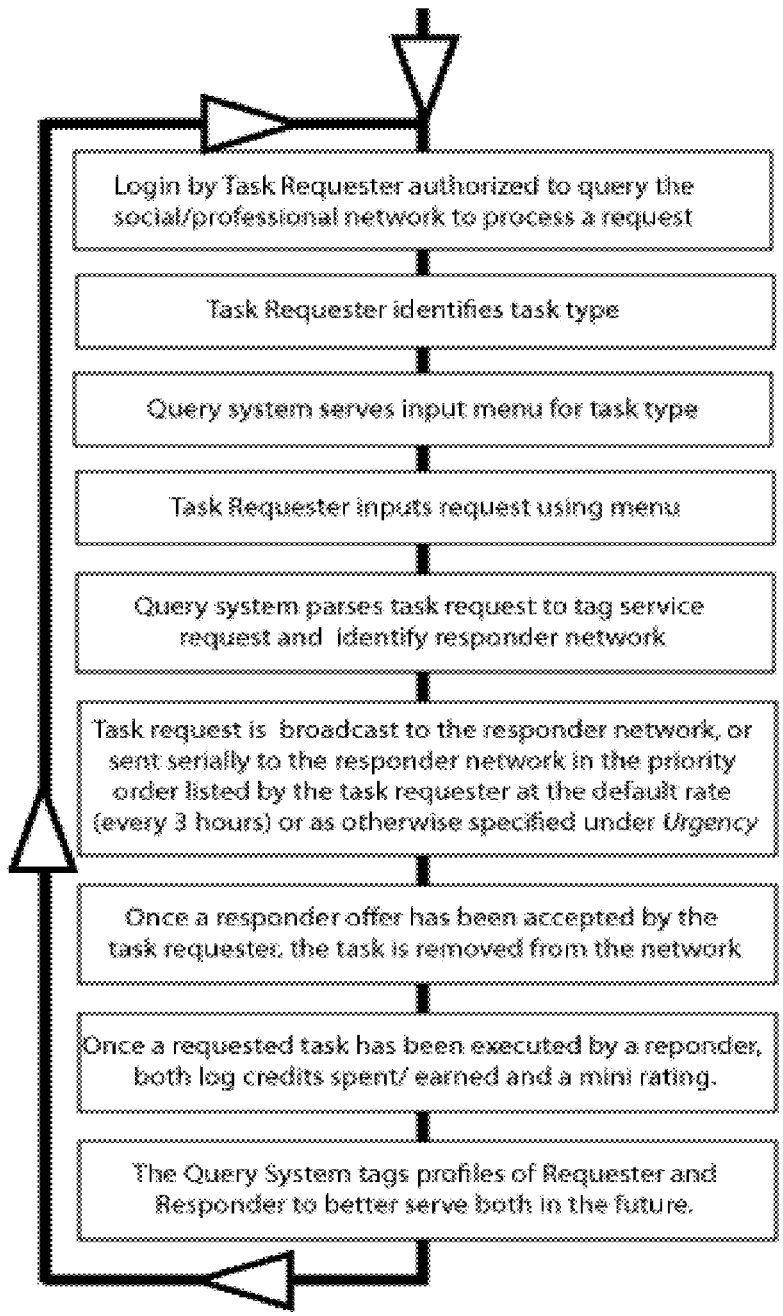
*Figure 5. Flow Diagram. Query Responder System*

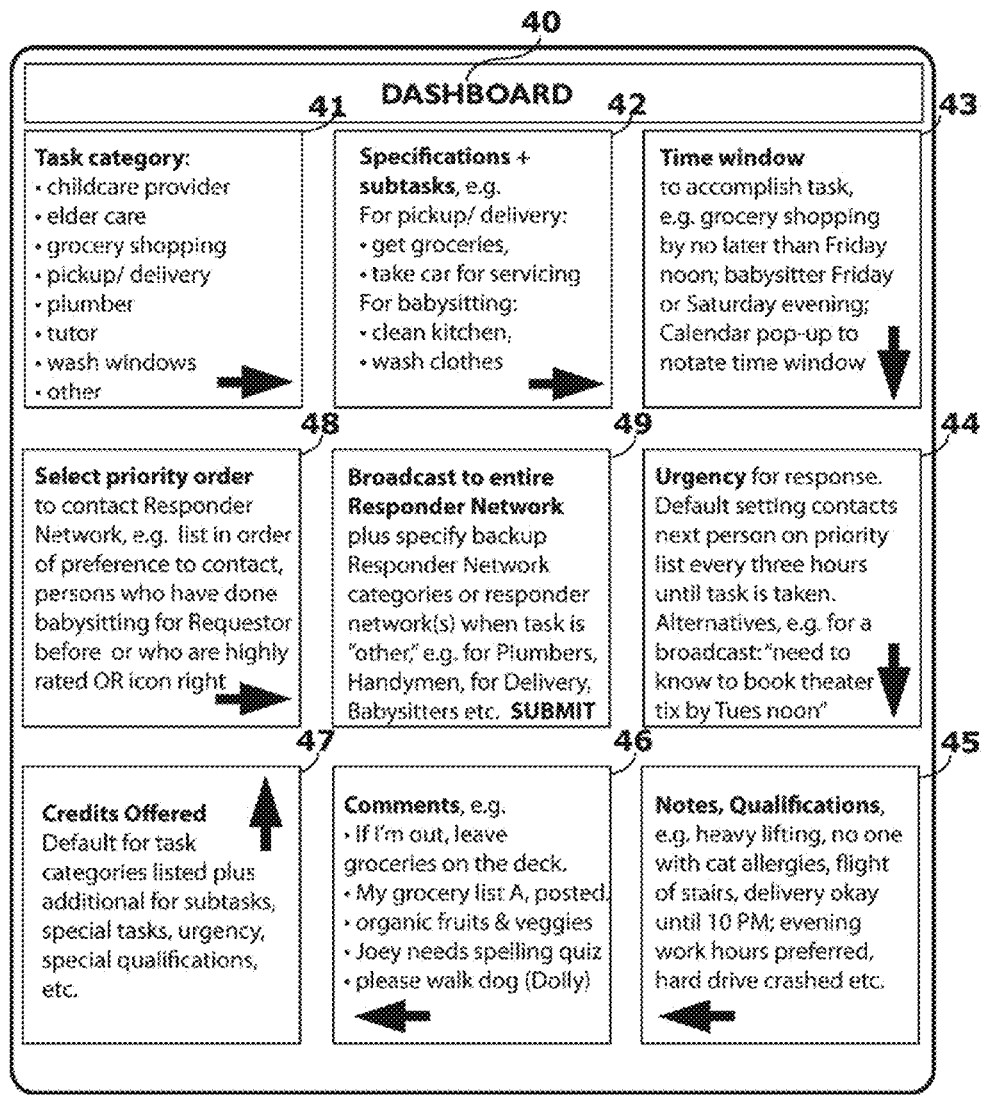
*Figure 6. Features Accessed by User Interface in an Embodiment for a Task Requester - Responder System*

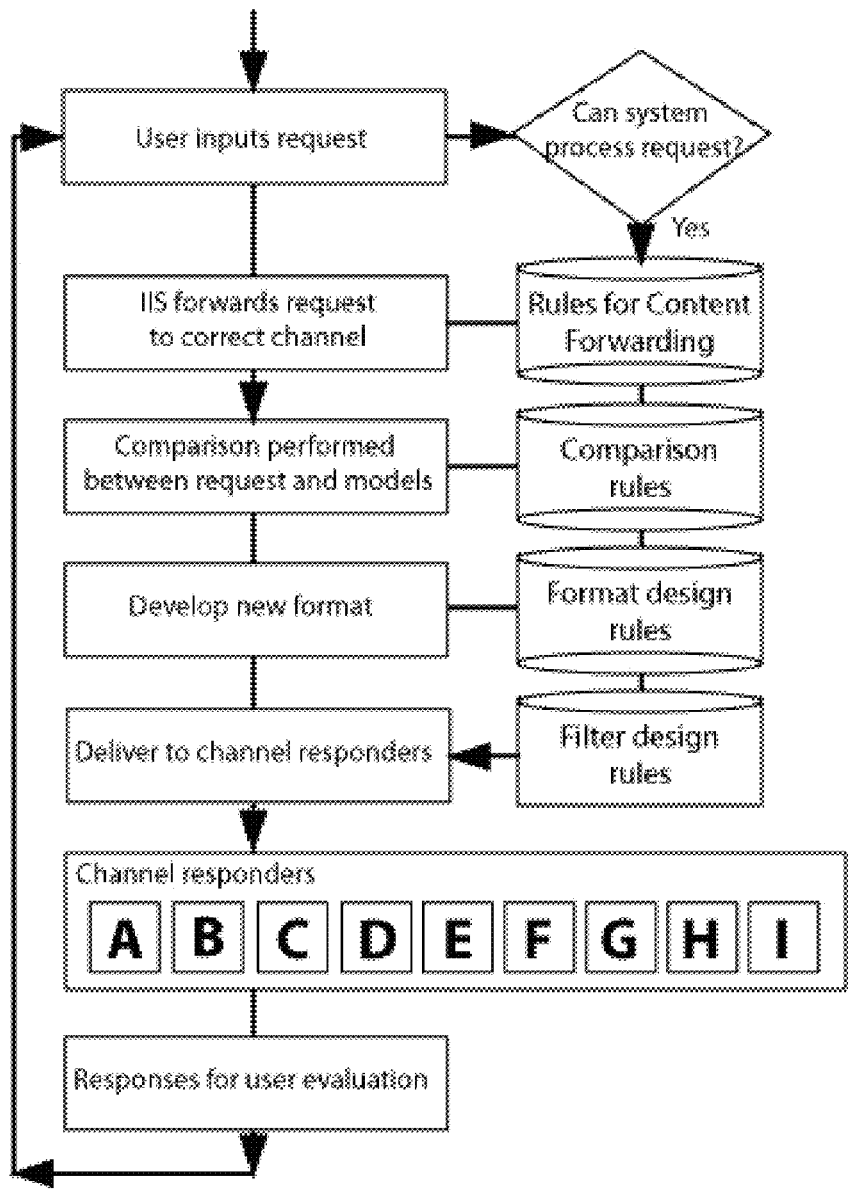
*Figure 7. Flow Diagram in a Multi-Channel System*

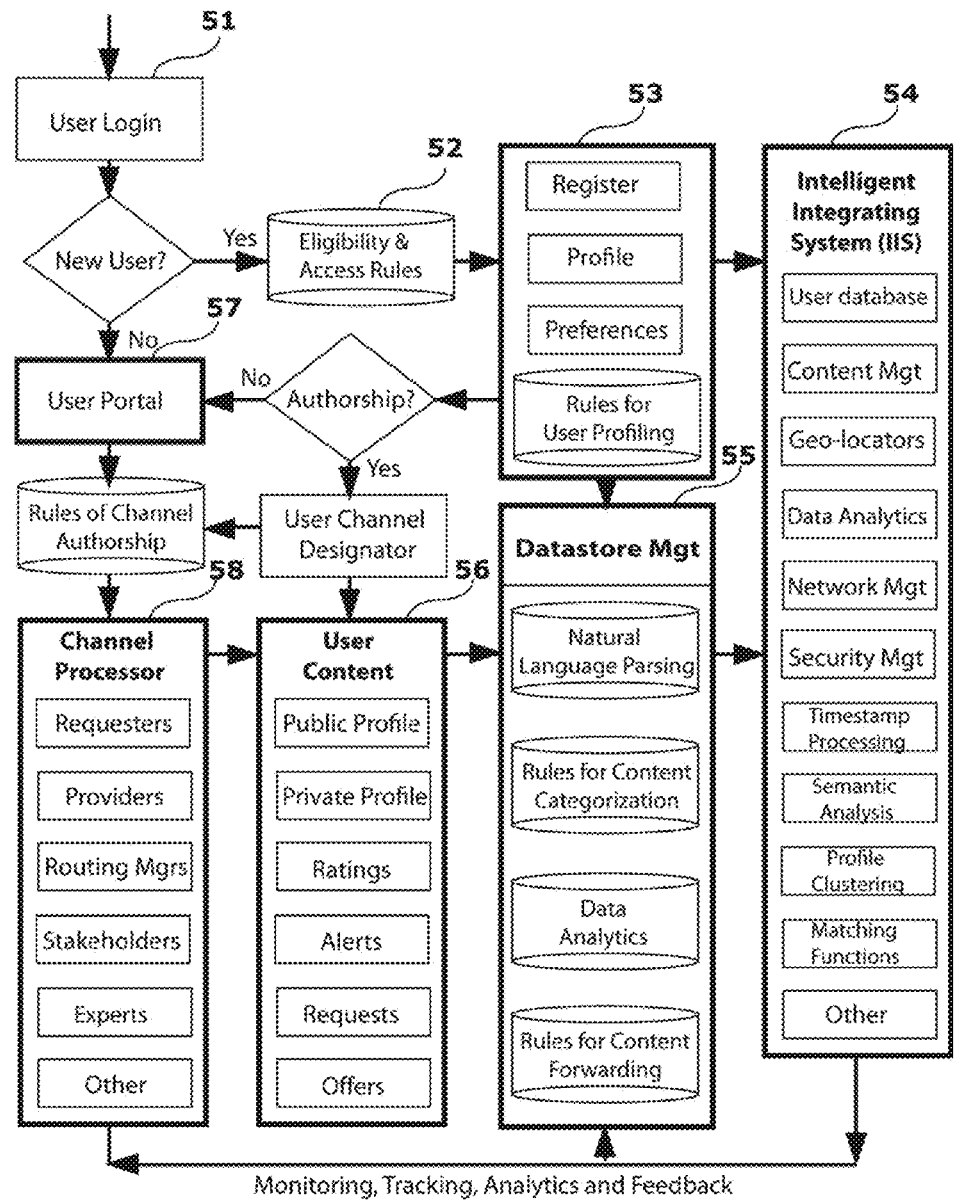
Figure 8. System Components & Architecture

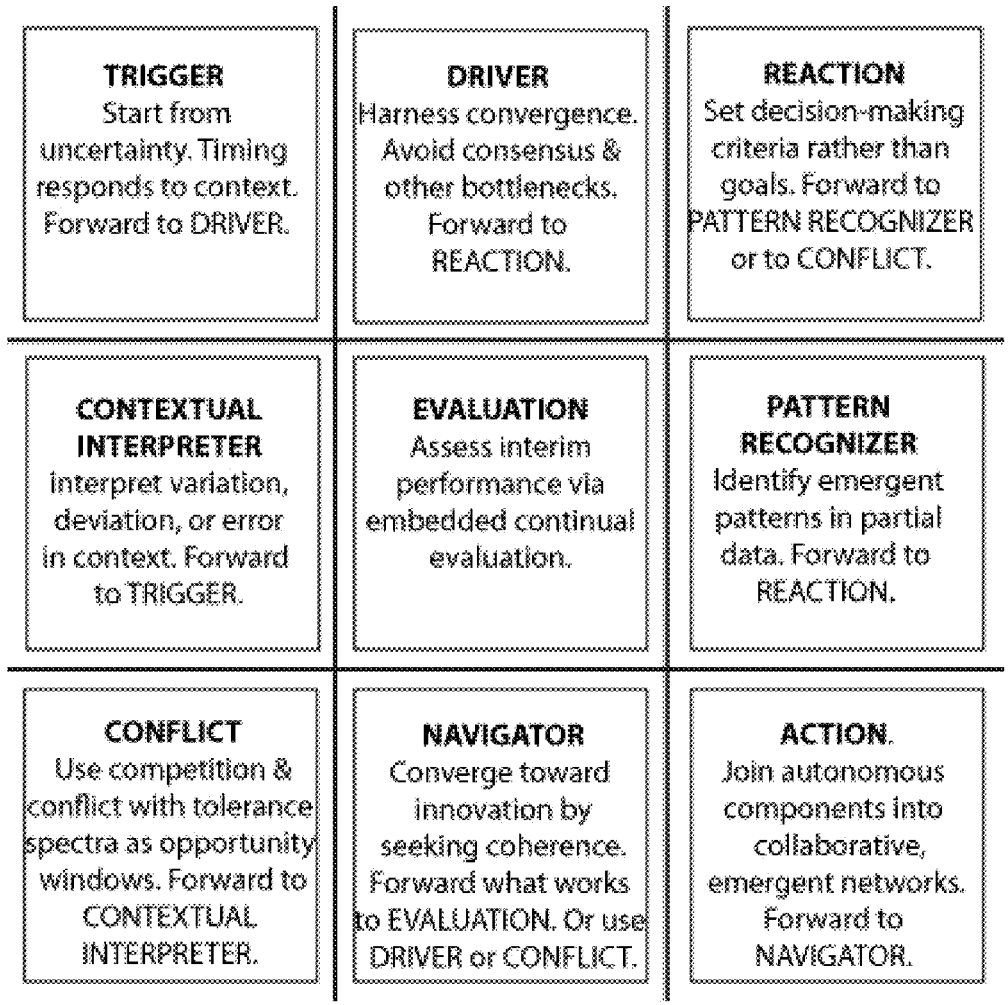
*Figure 9. TRACE Collaborative System Architecture*

CROWD-SOURCED PROJECT AND TRANSACTION MANAGEMENT SYSTEM FOR HUMAN- AND DEVICE-ADAPTIVE REQUESTER-PROVIDER NETWORKS

CROSS REFERENCE TO RELATED APPLICATIONS

This application is a continuation of co-pending U.S. Patent Application entitled "Profile-Responsive System for Information Exchange in Human- and Device-Adaptive Query-Response Networks for Task and Crowd Management, Distributed Collaboration and Data Integration, Ser. No. 12/817,167 filed on Jun. 16, 2010, which is a continuation-in-part of U.S. Patent Application entitled "Natural Language Knowledge Processor Using TRACE Or Other Cognitive Process Models", Ser. No. 11/733,736 filed on Apr. 10, 2007, which is a continuation-in-part of U.S. Patent Application entitled "TRACE Cognitive Process Model And Knowledge Processor", Ser. No. 10/602,824, filed on Jun. 25, 2003 which claims priority from U.S. Provisional Patent Application No. 60/391,861 filed on Jun. 25, 2002 and also claims priority from U.S. Provisional Patent Application No. 61/187,485 filed on Jun. 16, 2009, and incorporates those applications herein by reference for all purposes.

FIELD OF INVENTION

The invention provides a computer-implemented method to manage a diverse natural language sender-receiver network, and the database for an Intelligent Integrating System (IIS), including a task request and response network for distributed problem-solving, augmenting internet-based social networks such that those networked can collaborate via mobile devices, computers or other means to exchange timely, geo-located, topical, and personally targeted, information.

BACKGROUND

Advances in ubiquitous mobile computing make it possible to provide networked services to a distributed, diverse network of users. The rapid development and customization of web applications serving to mobile devices, and of geo-aware systems, enables a community network to implement just-in-time knowledge-sharing and response. Social Networks are the foundation for next generation user-responsive information systems, and for collaborative problem-solving networks engaging multiple co-dependent services, using geo-locators and timestamps to coordinate timely, effective response to user needs.

Computer scientists have developed collective intelligence algorithms to deliver better-than-average predictions in response to generally quantitative questions, such as "What will the price of DRAM (Dynamic Random Access Memory) be next year?" However, insufficient attention has been paid to the complementary potential of collaborative intelligence. The subject invention uniquely integrates collective intelligence with collaborative intelligence. The anonymity of system users, who can access the system from diverse computing and mobile device client platforms, is maintained by a back end that supports collective intelligence (defined here as the collected aggregate input of many anonymous discrete responders to specific, generally quantitative, questions). Alternatively, the system can shift from anonymity to acknowledged identity, supporting social network participation that harnesses collaborative intelligence (defined here as diverse, generally non-anonymous, credited, time-stamped participation in a natural language system, which may include qualitative input).

The convergence of environmental sustainability and information technology offers potential to harness collaborative intelligence whereby, as in social networks, unique individuals contribute their particular expertise to in-person or online gatherings (henceforth referred to as events), ranging from conventions, trade shows, concerts, and sporting events, to distributed networks comprised of diverse human and computer agents, collaboratively performing services through applications that harness diverse skills to address complex problems. Environmental emergency and remediation, e.g. to respond to an oil spill, requires coordinating distributed, cross-disciplinary teams to achieve effective collaboration amongst non-anonymous persons with diverse expertise, across different disciplines, organizations and locations. Future distributed collaborative responder systems can address a broad array of needs, ranging from service and commodity provision, to social and professional knowledge-sharing, security and safety in environmental hazards, with potential to harness geo-aware devices, sensor networks and distributed, situation-aware technology.

Efforts in the field of the current invention have focused on automating problem-solving in data processing networks such that service requesters are routed to the correct service provider agent. Typically, such systems rely on the computer system's capacity for pattern recognition. The subject invention addresses the challenge to create a system that also harnesses human pattern recognition capacities where needed and delegates to the computer only tasks that the computer can effectively perform. The subject patent includes a human-computer interface, such that the system engages both human and computer pattern recognition skills. Typically systems are hierarchical, with top-level decision-making agency that hands down through the system. The subject invention enables browsing, whereby the user can choose among alternatives offered. Methods exist that use an interactive, or rule-based, processor to annotate (or tag) text with the symbols and vocabulary of a hypertext markup language, enabling the user to manipulate and view that information in different formats and at different levels of detail. However, the subject invention addresses the need for methods that effectively combine automated tagging with human recognition and rating systems.

The present invention differs from the prior art in that it exploits the complementarity of collective and collaborative intelligence, which also entails the integration of computer-automated tasks (suitable for collective intelligence) with human pattern recognition (required for collaborative intelligence). To harness the collaborative intelligence of diverse participants entails automated tagging of user profiles while also crediting individual contributions in a knowledge processing system wherein users share information, personal ratings, recommendations, assessments, and other communications.

SUMMARY

The present invention provides a non-transitory computer-implemented system to support distributed knowledge-sharing, rapid updating, and collaborative problem-solving using natural language via web applications, mobile devices, computers or other such devices on a network, which may be wireless, a wide area or local area network, the internet, intranet, or a private network, such as a localized community, a virtual private network, social or professional network, or a network of networks.

Supporting event or task management, product and service networks, the subject invention serves multiple categories of users, cross-referencing categories and user profiles, allowing assessment of relevancy and user preferences. In one embodiment the system can provide information and just-in-time alerts, responding to user-stated preferences, user activity, and click profile. The original user-entered profile evolves, augmented through user activities in the system and ratings, such that the system can respond more effectively to user capabilities and needs. User entries and audit trails augment explicit preference settings as implicit preference indicators stored in computer-readable memory. Content is searchable and can be retrieved using key words or ontologies. User identities, as in social networks, include profiles and tags.

Entries and queries can be structured by the software of the Intelligent Integrating System (IIS) to provide directed guidance to achieve convergent problem resolution, bypassing roadblocks of conventional, consensus-driven collaborative process models by enabling discrete responders on the network to input independent views, unconstrained by pressure for consensus from the group. Iterative query structuring may be automated or allow human judgment, in either case implementing an iterative query system that converges toward a problem resolution. Expert users trigger the system to launch more sophisticated rules, queries, and levels of participation.

A backend database supplies computer-readable memory to support an Intelligent Integrating System (IIS), which sorts and tags user profiles, providing multiple channels and levels of authoring and access for a growing, evolving, distributed, collaborative social network implemented on non-transitory devices. IIS process records monitor levels and types of participation, such that the system evolves toward more effective performance. The subject invention offers capacity to serve and track one-to-one, one-to-some, and one-to-many alerts, notifications, broadcasts, and task requests, to integrate in memory and to access and distribute relevant information, alerts, and program updates, customized to user profiles and preferences. Where used in a task distribution network, tasks are distributed to first qualified responders, canceling, and so avoiding, duplicate responses. The subject invention provides the foundation for effective, efficient service for professional social networks in shared activities, ranging from transactional management to conventions and trade shows, to community services, such as health care or emergency responder systems or the exchange of goods and services.

BRIEF DESCRIPTION OF THE DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which:

FIG. 1 shows an abstracted conceptual diagram for one embodiment of the invention, a knowledge platform, serving and receiving from diverse non-transitory devices, channeling data from users with diverse profiles, belonging to different categories.

FIG. 2 shows how the subject invention connects diverse user channels with diverse non-transitory computing systems 21, mobile devices 22 and server platforms 23 serving diverse user channels (24 A, B, C, D, E) in the cloud and/or across wireless, wide area, and local area networks such that an Intelligent Integrating System in any location, or distributed, can operate on the data generated 25.

FIG. 3 shows one embodiment of the invention, with nine buttons identified by icons represented on a mobile device touch screen, or other user interface, applicable for, but not limited to, conference and trade show information systems, contributor-receiver systems, task requester-service provider systems (where service providers may also be task responders). All nine icons can be addressed, starting in the upper left-hand corner, circling clockwise, ending with the center icon for Alerts+Starting Now, calling for immediate action or, as in another embodiment shown in FIG. 6 to submit/broadcast to the network.

In one embodiment, shown in FIG. 4, each icon of the graphical user interface links to a feature set associated with said icon. FIG. 4 shows one possible organization of mnemonic icons in a graphical user interface, where each icon can open scroll or dropdown menus covering the feature set of the system represented by said icon.

FIG. 5 shows a logical flow diagram for a Query Responder System and Task Requester in a transactional embodiment of the subject invention.

FIG. 6 illustrates how a user interface on multiple user devices in one embodiment of the present invention structures the problem-solving process and is used in this embodiment to match task requesters with task providers wherein the same icon is used by the task requester and also by the task provider. FIG. 6 describes one embodiment wherein the icons 41-49 may offer pull-down menus.

FIG. 7 illustrates a logical flow diagram in a multi-channel system wherein the Intelligent Integrating System (IIS) sorts, tags, timestamps and forwards a user request to one or more channels for processing.

FIG. 8 illustrates the system components and architecture for one embodiment of the invention wherein user-generated content, is allocated to multiple channels that serve different user roles and needs, offering different levels of permissions and authorship.

FIG. 9 illustrates an alternative mobile device graphical user interface for an embodiment of the present invention for collaborative problem-solving, using the TRACE Cognitive Model and Knowledge Processor.

DETAILED DESCRIPTION

The invention described herein uses the term device to describe any non-transitory terminal with computing capability and memory, including a personal computer, navigation device, tablet, a wireless mobile device, cell phone, smart phone, or media player, television set top box, or other networkable device. The term client refers to software programs or applications that can be implemented on a terminal, ranging from transactional exchange programs to games to mobile applications (or apps). The term server describes one or more computers configured with server functionality, including capacity to receive and process requests, route responses, organize, tag, categorize, map, and manage data, and execute analytics, including storing and updating user profiles based on users' history of activity in the system. The term processor can include multiple cores for multi-thread or parallel processing. The storage medium may include memory modules, e.g. Read-Only Memory (ROM), Random Access Memory (RAM), flash memory modules, and mass or distributed storage. Display devices offer a graphical user interface (GUI), such as geographical maps, concept maps, display of task data or "gameboard." The term platform refers to the customization of selected components and systems to serve a given problem-solving task, or set of tasks. The term bid refers to any offer from a provider on the platform, which may include resources, proposals, assessments, data analysis or other provider contributions. Diverse users, e.g. requesters and providers, apply their different capacities for pattern recognition and selection to navigate, choose options, and contribute, thereby evolving through their participation both their own profiles and the Intelligent Integrating System. The term Intelligent Integrating System (ISS) designates the integrated performance and evolution over time of the components and systems of the subject patent. As the ISS learns, it improves its capacity to generate automated responses and to support a growing, diversified network. In the following description, for purposes of explanation, numerous specific details are set forth in order to provide a thorough understanding of the invention. It will be apparent, however, to one skilled in the art that the invention can be practiced without these specific details.

The subject invention comprises a plurality of non-transitory components and systems that together can support both collective intelligence methods, processing data from anonymous users, and collaborative intelligence methods wherein participant contributions are credited and tagged to individual contributors such that they become searchable "contributor fingerprints" (the total record of contributor actions in the system) enabling the Intelligent Integrating System to cluster like users into subgroups, on which various automated procedures can be performed, including but not limited to, statistical analysis, predictive calculations, market and risk analysis, rating, tallying, grouping, tagging, sorting, linking user profiles, aggregating, integrating, targeting, publishing, retaining as confidential etc.

The Intelligent Integrating System uses a natural language system to elicit, receive, and organize information from multiple channels, wherein non-structured natural language queries and responses can be converted to structured components that can be tagged, analyzed, searched, clustered, sorted and integrated to satisfy activity requirements, user preferences, problem-solving constraints and trade-offs, in order to deliver information as needed in response to user requests, profiles, preferences and past usage activity in the system.

In one embodiment various automated procedures can be performed on queries and query responses, including but not limited to, statistical analysis, rating, tallying, grouping, tagging, linking to user profiles, aggregating, integrating, publishing for public comment, retaining as confidential etc. Query generators operate on data stored in any non-transitory terminal with computing capability and memory. Client software includes query analyzers able to receive, rate, cluster, search, tag and perform other operations on query responses.

One embodiment of the present invention, as in online games (or network games) operates in client-server mode: a user provider 5 logs into a client, which obtains a task request 41 from a Requester (FIG. 5), which is served back to the user. After performing the task, the user receives payment, experience or reward points. Both Requesters and Providers can register, via the web or mobile devices, to contribute and receive information customized to the user profile, as defined by user-selected preferences, by the user's history of activity in the system, authorship role, and relation to others using the system. When a user registers online for a product or service that can be optimized by comparing user profiles, the user is directed to set up a profile and preferences Users can log in, either via a custom website, e.g. "My [service name]" or, for small service communities, via a unique service channel on a general website, established to serve the subject invention.

FIG. 8 shows the user setup sequence. The user first logs in 51. The system is automated to check eligibility and access rules 52. The user can set up a profile 53, including, but not limited to, email address, through which the system can determine whether he's approved to register or not. The email address serves as the user ID, first name, last name, company, position, mobile phone (automatically recorded if the user registers or logs in from a mobile phone), website(s), password, and preferences. User preference options shown in FIG. 3 include, but are not limited to, Timeline/Calendar 31, for uses ranging from benchmark dates in project management to sessions that the user has chosen to attend at a conference or event; Alerts and Starting Now 39 for options selected by the user or recommended; Maps 34 relevant to the service requested; Meetups & Matchups 35, which identifies people who share similar user preferences (matched by profiles). Breaking News 33, may include alerts, updates and other information; and Links 38 to complementary applications.

After the user registers by logging in and setting up a profile 53, a dashboard such as shown in FIG. 3 or FIG. 6 is presented, accessing a menu list of setup items corresponding to the order of the buttons on the user interface, enabling the user to pick service options and schedule them in the Timeline/Calendar 31 that feeds to the "starting now" alert button 39, highlight a map of the options selected 34, and choose preferences that will determine how priority alerts are received.

A basic embodiment of the present invention provides a means to coordinate large numbers of participants, including means to rate products and services via multiple channels for different categories of users, products, and services. FIG. 1 shows one embodiment wherein an Intelligent Integrating System (IIS) 1 comprises a database categorizing multiple channel feeds 2, where channels serve different categories of users 3. Knowledge platform channels may include, but are not limited to, User Communities 3, Sponsors/Stakeholders 4, Producers/Providers 5, Requesters/Receivers 6, Supply Chain Managers 7, Domain Experts 8. These different communities have different levels of access, permissions, and rights of authorship. The IIS tracks and records usage by ID, geographic-locators, timestamps, category of user, user profile, and user actions in the system, whether this IIS functionality is applied to conventional events or to online or asynchronous exchanges or transactions.

A user may belong to more than one user category but can participate in only one category at a time. The Taxonomy of User Profiles 9 evolves as users interact with each other in the network 10 and use the Knowledge Navigation Map (Graphical User Interface or GUI) 11. These three components form the basis of the Knowledge Platform Serving and Receiving from Diverse Devices 12.

The functions 1-12, described above, comprise one embodiment for a multi-channel Intelligent Integrating System with capacity to grow and evolve through use as users post recommendations to others. Optional augmented functions include External Content Feeds 13, Links to other Tools and Applications 14, Automated Systems 15, with potential for the system database and its members to be translated to other Mirror Networks 16. In some applications, channels include pre-loaded and on-the-fly content from the host, which may include "Alerts" 39, "Breaking News" 33, or other content 35.

The subject invention can track who went where, how long they stayed, and which products, services, knowledge, or opportunities were of interest to them. The Intelligent Integrating System serves all users, enabling them to see rapidly what's available, who's where, to receive alerts about opportunities and deadlines, and to set preferences for alerts and other notifications. This embodiment of the present invention is an interactive system, providing multiple channels for diverse user communities 3 and external content feeds 13, enabling stakeholders 4, Providers 5, and Requesters 6 to find what they need and to better contribute to and benefit from contributing to a given task or "gameplay." The two basic roles of the system, Producer or Provider 5, and Requester or Receiver 6, are implemented with different subcategories and levels of access. For example, a Provider is one category of contributor; a Sponsor is another; a service Requester is a third.

When the user clicks Calendar setup 31, he is presented with the option to create his own calendar, using his computer or mobile device. The Calendar|Events button 31 connects users to relevant information, either requested or automatically matched by profile. Different categories of users are able to post events to an event calendar, including, but not limited to, location, date, time, host, and comments. The user interface includes the functionality of Hot Buttons 32, which the user can customize into personal hotlinks. Breaking News and Messages 33 offers a scroll or dropdown menu where news and announcements and other important notices can be posted. Users receive postings, prioritized according to their explicit, stated preferences and implicit preferences, defined through previous use of the system. Hot Buttons 32, connects to offers and may have a scroll or dropdown menu where users can download maps and highlight their points of interest. The Meetups and Matchups Button 35 can include a dropdown menu wherein users can, through multiple choice questions and/or short text messages, create their personalized profile signature to receive recommendations of whom to meet virtually or in person, wherever the system of the subject invention is being used.

In the embodiment shown in FIG. 3, a Launch Alerts Button 39 provides a place for sponsor notifications, and enables users to gain an overview of events, demos, launches or other special offers. Selections listed in a users' preferences appear at the top of their launch alerts lists. Sponsors can post their messages, customized for receipt according to user profiles and stated preferences. A Rate and Review Button 37 enables users to rate and recommend their favorites. Items most recommended are forwarded to Breaking News 33. Competition opportunities may also be posted as Alerts or "Hot Buttons" 32. FIG. 6 shows another embodiment wherein the system offers the user capacity to post what he is looking for 41 (as a Requester), and to respond, specifying what he can offer (as a Provider). In one embodiment this function can be used by employers to post job notices. Users can, through multiple choice questions and/or short text messages, create their personalized profile signature for recommendations of whom to meet virtually or in person wherever the subject invention is being used.

A Links Button 38 enables users to link to other Apps and Social Networks, and to integrate complementary feature sets into a single system, recorded in the database of the Intelligent Integrating System (IIS). Notifications can be distributed to different categories, as determined by user profiles. These may include alerts to profile-relevant opportunities, organizer and sponsor functions. In one embodiment, links to Notifications (categories, such as lobs, hires, tech launches etc.) include alerts to profile-relevant opportunities and Producer/Provider 5 and Sponsor/Stakeholder 4 functions, enabling Producer/Providers 5 to update their offerings.

A range of Sponsors/Stakeholders 4 can provide preloaded rich content 13 to a Knowledge Platform Serving and Receiving from Diverse Devices 12. An embodiment customized for localized events, conventions and trade shows FIG. 3 includes content from sponsors 33, the hosting city 34, and social networks 35. New content can be added on-the fly, in real time, from multiple channels. The Breaking News button 33 connects to the news network channels. The launch alerts button 39 links to a related suite of technology tools, which complement the subject invention. An embedded continual assessment tool using Transaction Records 36 provides data about the success of the event, how users participated, and their preferences.

The above basic embodiment, once implemented, can be adapted to serve a range of other types of applications, based on the multi-channel, contributor-receiver model, such as Disaster response following a hurricane, earthquake, or other catastrophe, Health and clinic network response and elder homecare emergencies, Networked learning initiatives, group projects, monitoring student progress, Distributed teamwork, onsite/offsite/diverse locations.

FIGS. 5 and 6 shows a second embodiment of the present invention to address easily specified tasks, such as, but not limited to hiring local talent to perform work, activities, announcements, classes, delivery, events, childcare, interest groups, rideshare, volunteer opportunities, where the Task Requester specifies the task, and Task Responders offer to perform the task. Login by a Task Requester brings up that user's profile with associated categories and tags. Each Task Request is also annotated with categories and tags. Initiating a Task Request triggers updating of both the Requester profile and Task database, triggering the IIS to serve an automated query menu, which enables the Task Requester to format his request so that it can easily be processed by the Intelligent Integrating System. The task is parsed and analyzed for response by a recommender system. The Task Request is then allocated to Responders based on pattern-matching to related Task Requests and to Responder Profiles. Once assigned to a Responder, the Tasks is recategorized to "Processing" and allocated to a critical path timeline, which triggers the functions of Critical Path Tracking and Embedded Continual Assessment. Once the Task is completed, it is subject to Assessment and Integration into the Intelligent Integrating System's Knowledge Platform of Task Results.

This second embodiment of the invention could also be used, as shown in FIG. 6, as a method for Task Requesters and Task Responders to participate in a service network wherein the User first logs in with an ID and password. Users can be both Task Requesters and Task Responders, although some may use the system primarily, or exclusively, in one mode or the other. Everyone in the system has credits, either as a result of performing work that earns credits, or as a result of buying credits in the system. Those who use the system exclusively as Task Requesters gain credits by purchasing them, while those who use the System both as Task Requesters and as Service Providers, can exchange their products or services within the system for credits, which they can then spend to purchase other goods and services, or translate into cash payments periodically. A Task Requester pays in credits, transferred from his account to the account of the Task Responder. If the Task Requester has insufficient credits when he requests his next task, the system will remind him to refill his account.

A third cluster of applications applies the present invention to enable community members to address community applications, such as safety and security (police protection), fire protection, transport (e.g. share-a-ride, bus, train, plane schedules), tourist information (hotels and restaurants, local interest events), commodity availability, searchable in various ways, e.g. by commodity, costs, home and office rentals, locations, need, services, time of availability, store hours, real estate for sale.

A fourth, embodiment of the present invention addresses tasks requiring cross-disciplinary expertise, such as sustainable remediation and disaster relief, where a coordinated systemic response requires knowing who can supply what, when, and where, and who needs what, when, and where. This fourth cluster of applications supports a range of tracking and logistics functions, such as supply chain tracking, networked systems tracking, carbon footprint tracking, water tracking, and so on, applying, with some modifications, the backend developed for the first, second, and third applications above. Augmenting traditional methods of problem-tracking, the subject invention can cross-reference user actions within the system.

In applications, such as disaster relief or sustainable remediation, Task Requesters can instantly shift to become Responders and vice versa. The system enables rapid exchange of information from one to some or many, some to some or many, many to many, geographically locating items, people, tasks, and resources being tracked by Task Requesters and Responders, time-stamping Requests when submitted and Responses when committed (start time) and completed (end time), structuring and organizing problem-solving status updates to enable collaboration in unpredicted circumstances. The geographical locator stamping, and tagging of user entries and responses, allows geographic analysis of user needs and resources, and capabilities to meet those needs, by the Intelligent Integrating System (IIS), specifying queries by neighborhood, city, region, or other geographically defined category and clustering responses by location and other relevance factors, as well as performing profile analysis of users and comparative clustering across geographic categories with similar challenges and attributes where geographically specified sub-routines can be specified by task requesters to the query system running in a defined region.

The present invention enables greater efficiency in addressing tasks within a geo-proximal community, or in complex situations, which require rapid response on the fly, in real time, as in instances where traditional systems break down or prove inadequate. Problem mapping tracks process steps, which users may follow serially, in pre-specified or specified-on-the-fly sequence, or in user-selected order as circumstances require. Task order of execution is logged using an alpha-numeric interface, e.g. on a mobile phone or computer keypad, or a clickable or touch-screen graphical user interface. Distributed agents (human or not) gather, share information and collaborate to respond to problems posted as Task Requests.

Collaborative problem-solving by a distributed, cross-disciplinary human-agent social network entails pattern recognition and/or automated discovery and dynamic integration of distributed input from autonomous agents and human users, enabled by an Intelligent Integrating System (IIS). The IIS presents prompts that elicit human judgment in response. The IIS sorts entries into multiple categories, serving profile-responsive queries, tracking responses, performing aggregation and providing status updates, as well as sharing status updates at different stages of a collaborative problem-solving process. The IIS integrates data gathered from task performance, which can be automated for some functions, or support human computer interaction for others. The IIS tracks progress, archiving searchable process records and statistics. IIS services, processing functions, query systems, and integrator functions are core processes serving its distributed network.

The coding of data enables data representation and data integration, which could comprise any or all of the following methods of classifying query responses received based upon: steps of query intake through an alphanumeric keyboard or graphical user interface; time-stamps and geographic locators, context-coded natural language classifications and tags; mapping relationships, archiving relationship maps in a computer readable storage device so that they can be accessed from multiple nodes and retrieved in various ways; and updating responder profiles based upon query responses received from each responder.

The subject invention can be designed, where desirable, to have a game-like look and feel, and to apply traditional game techniques to motivate participation: points, prizes, levels, rewards, pingbacks, coupons, clues, tokens as components that can be selectively embedded into the system. Translating game-like attributes into the system motivates participation in the social network's problem-solving process, enhancing its service. Credit points can be converted into prizes and/or into cash payment for services, wherein a responder's level of contribution and expertise can be rated, using existing click-streaming technology. As in computer games, contributors advance to higher levels of participation based on their level of expertise and the value of their contribution, which can, in one embodiment, be measured through a credit points reward system wherein contributors are paid, or otherwise rewarded by credit points earned. In one embodiment, a first round, and each subsequent round of entries, serves as the basis for automated generation of future queries based upon previous query responses, comprising the steps of retrieving query responses from an individual agent or from one or more group of agents; segmenting the response into key phrases; scanning each phrase for patterns already in a pattern library and for new patterns that need to be archived; and producing a query generator for each query response grouping found, or selecting a query generator from among those that respond to similar response profiles.

In one embodiment of the invention user profiles can be augmented through credits, exchanges, rewards, ratings and embedded continual assessment, responding to individual and changing program needs. As in social networks, each user can invite friends to join and, as in pyramid models, contributors' total credit points are the summation, not only of their own credits, but a pre-selected % of the credit points of those they have directly invited and smaller % of those downstream from their direct invitee list, such that credit points of service providers may be translated to cash at defined payment intervals.

The subject invention provides for different levels of authorship, permissions, content filtering and access. Entitlement permissions are adjustable as the problem-solving process requires, ranging from confidential and anonymous to readable, open for comment, permission to edit, anonymous or credited to the contributor. Ratings or reward points may accrue to highly rated contributors, and where categories of permissions, and means of granting permissions can be revised.

One embodiment of the present invention enables dynamic distribution of tasks from Task Requesters with diverse needs to Task Responders with different skills. Each Task Request is time-stamped, geo-located and logged into the IIS knowledge processor, which tracks tasks accepted and performed, and logs performance ratings. User profiles, credits, and credibility evolve through use of the system through continual status updates. The system issues, and efficiently responds to, Task Requests. Task Requesters submit requests. Task Responders survey requests (sorted by time, type, geographic location etc.), prioritize and respond to those tasks they can most effectively perform. Through a credit exchange network, Responders earn credits for tasks performed, and Requesters pay for tasks.

One application of the Task Requester-Responder embodiment could address daily, often-needed household tasks, from plumbing to childcare to home delivery. The present invention enables more efficient delivery of a range of consumer products and services. In particular, the present invention enables sole proprietors and small business owners to participate in a network system able to deliver service advantages equivalent to those of larger companies—rapid response time, diversity of expertise, and capacity to track data or user profiles, as they evolve through use of the system.

Once logged in, the User chooses between two roles, in this embodiment consisting of:
1. Task Requester
2. Task Responder (Service Provider)

In other embodiments these contributor-receiver roles might include organizer and participant, health care provider and patient, teacher and student, and so on. If at the Welcome Screen the user chooses Task Requester, he'll see credits remaining in his account and be able to click to see costs of various tasks he might request. A text box will allow him to propose a task not on the list and propose a fee (payable in credit units) for that task, subject to approval.

It is an object of the present invention to enable collaborative problem solving, supported by a data processing network, through querying distributed agents and/or clients; receiving and integrating responses; generating, by the Intelligent Integrating System (IIS), new queries based upon Task Requester needs. User performance capability is defined by assessments, tagged to user profiles. The ISS supports collaborative problem-solving by maintaining individual responses private/anonymous, or making them visible/credited, as specified by the task requester or by each participant;
providing regular updates of the globally integrated response status, visible to the social network as needed;
receiving and parsing natural language comments from responders independently of each other when responders should not be influenced by others' responses; and publishing selected responses for comment discussion, rating or vote from a large, distributed group of user-responders when an iterative process, such as the Delphi method of repeated polling, is used useful to achieve convergence.

In one embodiment of the present invention, the query system on a mobile phone or other device, has a touch screen user interface with nine icons, arranged like a tic-tac-toe board, enabling the user to follow a multi-step process sequentially, in an order that is pre-specified specified on-the fly, or in a user-selected order, repeating steps as necessary, depending on the task, which in one embodiment can include wiki collaboration capacity. The graphical user interface represents response categories on an evolving, navigable content map.

When a User logs in for the first time, he's prompted to enter basic profile information. Since he won't have performed any services to date, he'll acquire credits through setting up a account. He must click to agree to the network rules: default charges for specified tasks, conditions when special additional charges are permitted etc. Once enrolled in the network as a Task Requester (one can enroll as a Task Requester without enrolling as a Task Responder), he will see a touch screen system as in FIG. 6:

1) Starting in the upper left icon 41 in FIG. 6, the Task Requester chooses a task, e.g. "plumbing."
2) Moving to the right, to the upper middle icon and scroll or pull-down menu 42, he specifies task and subtasks, e.g. "unclog kitchen sink"+"check slow bathtub drain."
3) Moving right to the upper right-hand icon and pull-down menu 43, he selects the Time Frame, a late afternoon window, any day.
4) Continuing clockwise down to the right-hand middle icon and scroll or pull-down menu 44, he specifies high urgency; contact priority plumber #1 first. After 1 hour, contact priority plumber #2. After two hours (if there's been no response) broadcast to the plumber network. After three hours (if there's been no response) broadcast to the Handyman Network.
5) Continuing clockwise to the right-hand bottom icon and scroll or pull-down menu 45, labeled Notes, he posts special qualifications that might preclude someone from performing the task, e.g. plumbing backup may require floor removal to access pipes. Or qualifications that allow someone with a day job to perform the task after hours: plumbing work okay until 9 PM.
6) Continuing clockwise to the middle bottom icon and scroll or pull-down menu 46, he adds Comments, special instructions not covered elsewhere.
7) Continuing clockwise to the left-hand bottom icon and scroll or pull-down menu 47, he notes default rates for plumbing network/handyman network. He can approve after hours rates at 1.5 default rate, special conditions or accept special offers.
8) Continuing clockwise to the left-hand middle icon and scroll or pull-down menu 48, he specifies the Plumber Network and chooses his first and second preferences, plumbers he's worked with before.
9) Ending on the center middle icon and scroll or pull-down menu 49, he clicks "Submit" to broadcast to the Plumber Network (after his top two plumber choices have been given first chance to respond). He specifies a backup network, the Handyman Network, to broadcast to if someone from the Plumber Network hasn't taken the task within the specified time window.

Each icon, when clicked, opens to a window with a multiple choice list, plus the alternative, "other," which opens a text box. Upon responding to all nine icons, the system prompts, "Ready to submit?" If he responds "Yes, submit," his request is tagged, time-stamped and sent to appropriate network(s). If he responds, "Stop|revise," he can revisit any or all of the nine icons to revise his request before submitting. FIG. 6 shows the clockwise structure of the graphical user interface in one embodiment.

If at the Welcome Screen the User chooses "Task Responder," rather than "Task Requester" on his first login, he'll be prompted to enter basic information, office location, phone numbers, Plumber's License # and special info (e.g. available 6 AM to 9 PM). He clicks to agree to the network rules, which may include, but are not limited to default charges for specified tasks, conditions when special additional charges are permitted etc.

After a one-time only registration on the Plumbers' Network, he sees a touch screen system:

1) Starting with the upper left icon 41 in FIG. 6, the Task Responder chooses a task, e.g. "plumbing" and sees a list of Task Requests. He clicks on a Task Request he might respond to.
2) Moving to the right, to the upper middle icon 42, he sees the address of the task request and a clickable map with directions and task specifics: "unclog kitchen sink"+ "check slow bathtub drain."
3) Moving right to the upper right-hand icon 43, he sees the time the Task Request was submitted, the Requester's Time Windows and Deadline to Complete.
4) Continuing clockwise down to the middle right-hand icon 44, which specifies high urgency level, he responds, saying when he can be at the task location.
5) Continuing clockwise down to the bottom right-hand icon 45 he reads Notes and Details: This Task Requester wants him to call first to discuss the task before taking it (possibly the Requester wants to conduct phone interviews with several candidates first). So he calls. He also notes listed qualifications that might preclude someone from performing the task, e.g. plumbing backup may require floor removal to access pipes and writes in that he also has a contractor's license and can do the floor removal/replacement.
6) Continuing clockwise to the middle bottom icon 46, Comments, he texts that he has a job at a nearby location, but that it may run overtime so after 5 PM would be best.
7) Continuing clockwise to the left-hand bottom icon 47, he accepts the terms: default credits for plumbing network/handyman network and approves after hours rates at 1.5 default rate, saying that he can perform the task between 5 and 9 PM if preferred. He clicks "agree."
8) Continuing clockwise up to the left-hand middle icon 48, he prioritizes, dragging and dropping to reorder his selected list of Task Requests he would like to respond to. He decides to retain (or not retain) any given task on his To Do Options list.
9) He ends at the final, Center middle icon 49, having decided which of the tasks listed on his middle screen to accept first. He can accept only one task at a time. When he accepts a task, it is automatically removed from all other plumbers' option screens. He proceeds to the location to perform this task. Other tasks he prioritized and retained to his option screen (middle icon) remain there, unless taken by other plumbers.

The system automatically removes tasks as they are taken and also blocks Task Responders from taking tasks if the Task Requester has specified: "Call Task Requester" before accepting task. This allows the Task Requester to interview several candidates before deciding, e.g. which babysitter to hire or which dog-walker is best suited to walk the dog. The level of automation can be customized, enabling the present invention to be used where personal contact is required prior to task acceptance by the service provider.

FIG. 7 shows how the system handles a generic user request, determining first whether the system can process the request or not, and, if yes, thereafter applying a series of rules to process the request and deliver it to the appropriate channel responder(s).

FIG. 8 shows the system architecture where users log in 51 to a system comprising both public access and multiple levels of privacy, depending upon user category and role in the system 52. New users must register, fill out a profile and select preferences 53. This information used to determine how the system will receive content from and deliver content to them. Users have different levels of authorship, determined by a user channel designator 56. They contribute content of different types and receive content according to their profiles, category of use 58, preferences, and past history of using the system 54. User content is managed by a datastore management system 55, that feeds into the intelligent integrating system 54, which processes data such that users can receive customized information according to their preferences 53.

FIG. 9 shows one embodiment of the invention, wherein the system is comprised of nine steps, five primary steps (referred to herein as the TRACE model, acronym for the five key steps) and four supporting steps, enabling users rapidly to access prompts and log their input.

TRIGGER (top left icon)—a Task Request or Query calling for response; when a Task Requester presses the trigger button on a user interface, the system records a GPS locator and timestamp. The user enters Task Requests or other triggers to investigate: problems, questions, observations. Proceed clockwise. Forward to DRIVER.

Driver (top middle icon)—Add details, e.g. for babysitter request, child's age, hobbies, favorite games. For handyman request: fix broken picnic table leg. Or, for collaborative tasks, team members respond to the trigger, adding relevant information from their perspectives, tasks and resources needed to address the problem. Forward to REACTION.

REACTION—In one embodiment a time window and deadlines are logged here. In other embodiments this third step identifies not only time constraints, but also other constraints and decision criteria (e.g. a medical emergency, heart attack victim). If criteria are co-dependent, they are linked. If they conflict, skip to CONFLICT. Otherwise continue to PATTERN RECOGNIZER.

Pattern Recognizer—Responders enter suggestions and overall project status, as well as priority action items. Forward to ACTION.

ACTION—Team members identify clusters of people, resources, tasks, needs etc. to augment by clustering. Forward to NAVIGATOR.

Navigator—Each team member distinguishes what's working from what isn't. What's working is forwarded to EVALUATION; what's not is forwarded to DRIVER or CONFLICT.

COMPETITIVE ANALYSIS—Identify and tag mutually conflicting specifications, e.g. instances where resource limitations demand tradeoffs (e.g. not enough ambulances for medical emergencies). Define tolerance windows appropriate to the problem context. Identify competition. In non-emergency response applications, such as learning applications, this step can define competitions/challenges to enlist game participation. Forward to CONTEXTUAL INTERPRETER.

Contextual Interpreter—Choose Task Responders in one embodiment. OR collect information, assessments, and proposals from selected Responders.

Each intake is logged with individual contact details, GPS, and timestamp. Forward to EVALUATION.

EVALUATION—Responder ratings may be either by number of Requests "closed" or by assessment of Task Requesters. At pre-selected time intervals, the system updates its Project Status Report. Users provide input on the status of their tasks by clicking SUBMIT and can request an UPDATE.

The TRACE Cognitive Model provides an iterative system to guide a plurality of contributors in a coordinated, collaborative problem-solving process. This method is capable of guiding a plurality of users with divergent views toward a convergent problem resolution, where convergence is defined as the resolution of a plurality of views whereby joint contributors to task performance do not perform the same roles, nor contribute the same expertise. This method does not require consensus on all aspects of the task for contributors to perform their particular roles in the collaborative system, and so bypasses roadblocks of conventional, consensus-driven collaborative process models. Discrete responders on the network can maintain independent views, unconstrained by pressure for consensus from the group. As in evolution, genetic diversity, promotes more robust solutions.

Each round of responses serves as the basis for automated generation of future queries based upon previous query responses, comprising the steps of:
retrieving query responses from an individual agent or from group(s) of agents;
segmenting each response into key phrases;
scanning each phrase for patterns already in the pattern library, and for new patterns that need to be archived;
producing a query generator for each query response grouping found, or selecting a query generator from among those that respond to similar response profiles.

The subject invention, by tapping the collaborative intelligence of large groups, augments social networks using mobile devices to support collaborative problem-solving by a large, diverse group of distributed humans and agents. The present invention supports a problem-solving ecosystem that can overcome the constraints of top-down, hierarchical management in conventional, consensus-driven problem-solving models and one-to-one communication systems (telephone, mobile phone, email) by using mobile devices as one-to-many requester systems and networking tools.

It can be easily understood by anyone skilled in the art that the subject invention can serve diverse broadcast/comment, request/response applications, including, but not limited to, large events, such as conventions, learning and training, environmental remediation and disaster response, and health care delivery.

While certain exemplary embodiments have been described and shown in the accompanying drawings, it is to be understood that such embodiments are merely illustrative and not restrictive of the broad invention, and that this invention is not limited to the specific constructions and arrangements shown and described, since various other modifications may occur to those ordinarily skilled in the art described in this disclosure. In this area of technology, where growth is fast and further advancements are not easily foreseen, the disclosed embodiments are designed to be readily modifiable in arrangement and detail to facilitate incorporating technological advancements without departing from the principles of the present disclosure and the scope of the accompanying claims.

What is claimed:

1. A plurality of non-transitory components and systems comprising a social transaction network, or social network, and problem-solving platform, wherein the network links distributed users, participating through multiple communication channels, with different levels of authorship and permissions, said network having capacity to connect:
one or a plurality of non-transitory terminals with computing capability and memory;
client software programs or applications;
one or a plurality of computers configured with server functionality;
data storage device(s) to support an Intelligent Integrating System (IIS);
graphical user interface(s) (GUI) reconfigurable to support different tasks;
one or more processors for:
combining collective intelligence methods for processing data from anonymous users with collaborative intelligence methods wherein, as in social networks, user verification requires use of real name and profile, and user contributions are credited and tagged to individual users to make searchable contributor fingerprints that comprise a total record of contributor actions in the network;
enlisting entries from, and querying, distributed users and agents;
receiving and parsing natural language user entries to tag, categorize, group, classify attributes, and integrate diverse entries;
generating new queries based upon user needs, e.g. requester queries and provider capacity to respond to queries, such that user performance capability is defined by prior performance and assessments, tagged to user real names and profiles;
maintaining individual responses private, anonymous, and independent of each other when needed, e.g. when responders should not be influenced by others' responses or when responders need to remain anonymous;
making responses visible and credited, as specified by the requester, by platform customization for a given application, by the user, or as specified in the task or project requirements;
providing regular updates on a globally integrated response status, visible to the social network designated by a specific task, thus enabling user input as needed for personal use, community, event, or project coordination; and
publishing selected responses for comment, rating or vote from distributed data analysts, who serve as providers when iterative crowd-sourcing optimizes fulfillment of requests.

2. The plurality of non-transitory components and systems of claim 1, wherein the systems further comprise:
data processing units, serving and connecting one or more communication channels, targeting, publishing, or retaining information as confidential;
data analyzers able to receive, rate, cluster according to filtering criteria, search, tag and perform operations on data generated by users and gathered by the systems;
search algorithms, based on "user fingerprints," requester needs, provider capacity for needs fulfillment and systems requirements;
clustering algorithms to group like resources known to the systems, including information and users, into subgroups, on which various automated procedures are performed, wherein said procedures comprise statistical analysis, predictive calculations, market and risk analysis, rating, tallying, grouping, tagging, sorting, linking user profiles; and aggregating algorithms to group unlike, but complementary, resources, integrating bids and sub-bids in response to requests.

3. The plurality of non-transitory components and systems of claim 1, wherein instructions further comprise:

gathering information from, and about, users such that this information is customized as demanded by a domain application and its task and resource requirements;

broadcasting queries or requests and gathering entries or responses, including but not limited to diverse assessments, expertise and knowledge from distributed users, requesters and providers such that the social network is engaged to optimize project performance;

adjusting and customizing system behavior to support different levels of user expertise and different types of user participation; and enabling users to participate anonymously, or to be credited, whereby a system administrator, as specified in each instantiation, implements a setting that determines which input is anonymous, and which credited.

4. The plurality of non-transitory components and systems of claim 1, wherein the instructions further comprise:

authenticating each user;

defining each user's unique user fingerprints as a component of the user profile, preferences, connections to other users in the social network, and a user's activity as tracked by the systems;

enabling users to invite others to join the social network, contribute or respond to entries or queries, submit and respond to requests, and provide other information;

enabling users to search the social network and data in the Intelligent Integrating System, including, but not limited to, using keywords, user profiles and entry tags, ontologies, accessing responses to queries, not only by user name, but also by content tagged by category of use, geographical location, time of response, tagging codes and other tags as needed;

enabling requesters to submit requests, wherein the term "request" refers to a query that solicits a response, bid, offer, or other input, whereby users submit quantitative, text-based, verbal entries, or rate alternatives in response to queries, requests or other entries;

enabling providers to submit bids, wherein the bid may be monetary, a proposal, assessment, data analysis or other provider contribution; and receiving user entries from mobile devices, computers or other network-connected devices, such that user data, and other performance-related data, is automatically classified into a processing network and retrievable through one or more channels as defined by the systems.

5. The plurality of non-transitory components and systems of claim 1, wherein, after a user is registered, after the user sets up a profile and preferences in the systems and logs in, a dashboard is presented with a menu list of setup items corresponding to buttons on a user interface, such that the user has options, which in one embodiment include:

picking events to attend, accepting to respond to requests and querying for information that will trigger a "starting now" alert button;

highlighting a map of a conference, community, work or event area and its surrounding environs; e.g. tradeshow floor with booths to attend and companies in the environs identified by the user's profile and preferences;

selecting preferences, which determine how priority alerts are received; and editing and augmenting preferences, such that each user's fingerprints evolve through use of the system.

6. The plurality of non-transitory components and systems of claim 1, wherein constraints are customized, said constraints comprising in one embodiment:

a graphical user interface representing response categories on an evolving, navigable content map;

one or more geo-locational, physical attribute(s), time or category constraint(s);

capacity to call up a regional map, search for talent within a defined radius;

category constraints that support matching talent based on user fingerprints and profiles in the ITS; and capacity to shift to "companies offering specified services" and initiate another search with a different set of category constraints.

7. The plurality of non-transitory components and systems of claim 1 wherein new content is added on-the fly by users can be addressed to users in the same or other categories, including, but not limited to, content from requesters, producers, sponsors, project managers suppliers, and customers, said systems allowing different categories of authorship, readership, permissions, content filtering, and access.

8. The plurality of non-transitory components and systems of claim 1 wherein entitlement permissions are adjustable as needed, and where categories of permissions, and means of granting permissions, can be revised, ranging from confidential to public, from anonymous to credited to a contributor, from published and readable to open for comment, or with permission to edit.

9. The plurality of non-transitory components and systems of claim 1, wherein the systems evolves as a result of both individual and aggregate behavior of requesters and providers by adapting to an overall status of a problem-solving process;

allowing users to shift roles, from requester to provider, or from sponsor to user, maintaining controls, such that a sponsor cannot respond to incentives offered by his own company and other controls specified by particular instantiations of the systems; and constraining behaviors of the systems to respond to individual user participation, to data on user behavior, to each user's unique capacity to engage other users, which defines his fingerprint, level of expertise and contribution to the systems.

10. The plurality of non-transitory components and systems of claim 1, employing a nine icon tic-tac-toe touchscreen for mobile devices, computer or other user interface, guiding the user through a step-by-step Query-Response or Requester-Provider interaction, which is followed in a natural clockwise sequence around the nine icon tic-tac-toe touch screen, or as needed by the user, wherein a ninth central button is used as a submit button, as a "starting now" or alerts button, or for other core functions, such as search, schedule, or QR code scanner, wherein each of the nine icon buttons can launch a menu calling up a feature set, allowing the user to interact with the systems, which is customized to serve different needs, such that information already in the systems is selected and aggregated for presentation to the user, enabling the user to receive or post new requests, e.g. for:
travel planning, linking social network accommodations to events;
priority locations on an event map and other topical information;
organizer and sponsor information and special announcement feed;
contributor names, profiles, identifying pictures, shared information and, when permitted by individual users, contact information;
calendar, preferences and customized schedule returned by the systems in response to manual selections, complemented by recommendations based on user preferences;
announcements, information, and social sharing;
customizable maps and schedules, responding interactively to user preferences;
local goods and services, geo-tagged by distance from a location or the user; and
password-protected, private-to-registered-users secure content, complementing public content shared through mobile and web distribution channels.

11. The plurality of non-transitory components and systems of claim 10, employing a nine icon tic-tac-toe touchscreen for mobile devices, computer or other user interface, wherein icon designations can be adapted for different applications and wherein buttons can be programmed to launch different feature sets and menus as needed, such as
compliance rules, updates, and alerts;
meetings and training workshops, including
alerts to individuals based on their roles and performance in the systems,
alerts concerning team selection or need to attend trainings, complete tasks, or meet other requirements with particular due-by dates and capacity for the systems to send reminders;
delays, scheduling changes, and dependency adjustments;
interactive critical path diagrams tracking project status, including but not limited to interactive Gantt charts;
preferred provider network(s), with auto-broadcast capability;
game-rules that constrain requests allowable to a given provider network, e.g. requisite minimum payment for established services or after-hours requests;
preference-settings that control what provider offers are received;
time or money-saving special offers from providers, allowing a user to specify preferences; and
requests or offers from members of a community network.

12. A plurality of non-transitory components and systems with capacity to integrate natural language, time-stamping, mapping, and information visualization to elicit, receive and organize information across diverse platforms that may include servers, client computers and client mobile devices, using wireless, Wide Area Networks, and Local Area Networks, wherein non-structured natural language entries, queries and responses are converted to structured components that can be tagged, analyzed, searched, clustered, sorted and integrated by an Intelligent Integrating System to satisfy event or project requirements, requester needs, problem-solving constraints and trade-offs, and to deliver information, resources and skillsets as needed in response to user requests, profiles, preferences and past usage activity in the network, wherein tagging data enables data representation and data integration, further comprising:
classifying entries or query responses received, said classifying based on a type of entry or query intake;
time-stamping when contributions are submitted, and/or time-stamping category clusters;
capacity to turn the time-stamp function on or off as determined by task needs;
geo-tagging, wherein contributions are geographically located when submitted and/or clustered under geographic locator categories;
capacity to turn a geographic locator function on or off as determined by task needs;
tagging to facilitate rapid recognition of knowledge categories;
context-coded and topic-coded natural language classifications and other tags;
relationship mapping, such that clusters augment user private-to-the-systems profiles, which can be accessed from multiple nodes, and retrieved in various ways; and
updating private-to-the-system user profiles based upon preferences, system usage, entries and query responses received from each user and the user's navigation paths and choices in the systems.

13. The plurality of non-transitory components and systems of claim 12, wherein geographic locators, tagging user inputs and responses, allow the Intelligent Integrating System to perform geographic analysis of requests and provider offers, rating a provider capacity to fulfill requests, which entails specifying requests by neighborhood, city, region, or other geographically defined category, clustering provider offers by constraint factors specified by the requester, producing profile analyses of users, and comparative clustering across geographic categories, enabling geographically specified sub-routines to be specified by requesters to a provider network in a defined region and for requests and provider offers also to be defined by non-geographic constraints as needed.

14. The plurality of non-transitory components and systems of claim 12, wherein a capacity for embedded continual assessment produces data assessing requester needs and provider capacity for fulfillment based on past performance, recording how users participated, comparing alternative provider capacity to optimize transaction success based upon, but not limited to
explicit numerical ratings by requesters and providers in response to short survey questions;
pre-purchase of future discounted request opportunities in the systems;
patterns of network connections among requesters and providers and individual connections; and
browsing, searches and other activity in the systems.

15. The plurality of non-transitory components and systems of claim 12, further comprising the steps of:
retrieving textual information from a requester;
scanning each request for patterns that match existing pattern-recognizing templates in a pattern library;
comparing one or more key patterns to data stored in the pattern library based upon past usage of the systems;
using the compared key patterns to generate templates for rapid processing of future similar patterns;
comparing requester queries with provider responses to assemble pairings of related queries-responses to develop templates;
classifying and linking co-dependent patterns into relational clusters that persist and are translated to other instantiations and applications of the systems; and
merging similar requester-provider transactions, such that merged queries are stored and retrieved based on common search terms such that concept-based retrieval combines multiple search terms and Boolean search operators.

16. A social network wherein distributed, diverse providers offer or bid to provide different resources and services, said social network having capacity to learn from past actions in a system and to guide a plurality of users with divergent needs, offerings and priorities toward optimization of provider bids to requester needs, using an Intelligent Integrating System, wherein a location and identity of the Intelligent Integrating System (IIS) can be distributed, reside in a cloud, or change without any perceivable experience of system change by the users, said system comprising non transitory computer readable storage media, including program logic embedded therein that causes control circuitry to perform the following steps:

accessing input from users, whether requesters or providers;

comparing multiple inputs from users, match requesters with providers based on pattern recognition algorithms to match user fingerprints and profiles;

identify gaps and query for missing information if requester or provider entries do not provide complete information;

continually updating requester-provider transaction status, responsive to critical path task execution requirements and perceived knowledge, resource and execution gaps;

generating queries based upon user profiles, preferences, and prior user activity in a network;

storing data in a repository accessible on the network, responsive to a context, including time and location, which requires identifying, collecting, and utilizing a pool of background data to generate analyses and subsequent queries;

generating and publishing, either to all users, or to a cluster of selected users, status reports or new queries on-the-fly based on comparative analysis of user inputs, profile analyses, geographic location, or identifying missing data points, thereby recognizing that the users or the system needs further information or has requests that could be served by the providers that are registered;

convert natural language, text-based responses, choice clicks, and data into formats for categorization at different levels of detail;

accessing and tag entries from humans, computer agents and devices, comparing and, where appropriate, summing the input;

rating and tag query responses of each agent, based upon a distance of that agent's input from a summation value;

defining each agent's profile based upon a consensual or outlier status of each entry contributed by that agent;

summing profiles to examine populations of requesters, providers, agents, subgroups, and users as a whole; and examining consensus, outlier patterns, and mapping trends over time.

17. The social network of claim 16, using an interactive, or rule-based, processor to annotate or tag text, wherein any electronic document, text-based or having a mix of graphics, audio, video, and/or predefined hypertext in addition to text, containing requests, bids, statements, indices, variables, decision points, recommendations, or other data, are adapted for tagging such that:

knowledge in a computer system and meta-knowledge about knowledge in the computer system persists and evolves over time;

entries, regardless of date, that remain relevant because of their connections in the computer system do not expire whereas outdated information expires and is removed from the computer system; and trends, and changes in trends, are examined over time, such that the computer system is used, not only to predict trends, but also to drive constructive innovation.

18. The social network of claim 16 wherein requests, bids or other offers and queries are organized by software according to pre-established, weighted criteria, to coordinate bid selection to achieve an optimized (tradeoff-balancing) outcome, bypassing roadblocks of conventional, consensus-driven transaction models by enabling discrete responders on the network to enter independent bids, offers or contributions, unconstrained by pressure for consensus from a group, such that iterative query structuring is automated or allow human judgment in an iterative system that converges toward an optimized outcome.

19. The social network of claim 16 wherein a hybrid request, coupled with offer(s) or bid(s), initiated by a requester, constitutes a request comprising some components wherein the requester also acts as a provider, or has already selected one or more provider(s), with some gaps to be fulfilled by bids from other providers, and a hybrid bid, coupled with request(s) initiated by the provider, constitutes a bid comprising some components that the provider delivers with some gaps to be fulfilled by requests to other providers, thereby partitioning the request into sub-requests, triggering an iterative request-bid process wherein selection of multiple providers leads to an integration of bids optimized by a computer system to fulfill the request(s).

20. The social network of claim 16 wherein steps further comprise:

performing decision analysis and tradeoff evaluation in a design of requests;

rating alternative provider networks for request distribution;

performing iterative processing to generate customized, automated responses to bid providers, and further queries if additional information is needed;

generating a cost-benefit analysis of tradeoffs to assess bids;

establishing capacity to assemble a hybrid request, coupled with bid(s), or a hybrid bid, coupled with request(s), thereby generating subordinate request(s) or subordinate bid(s);

performing bid optimization through integration of multiple bids and subordinate bids; and performing a token exchange to confirm provider selection, which auto-generates bid-closure notifications to all other bidders.

21. The social network of claim 16 further comprising steps for verification of users by:

storing real name for actions in a computer system that affect user profile among a community of users;

providing a code delivered to a registrant verbally or as text, e.g. via phone or mail;

requiring users, when needed, to provide a credit card number, validated as part of a registration process, which is used to pay for requests, or in instances where provider delivery does not fulfill requester expectations, to cover remediation costs;

storing profiles in the system, which are grouped into categories, e.g. for rating alternative provider networks for request distribution; and to assure users of system privacy, safety, security and emergency preparedness.

* * * * *